US012769989B2

(12) United States Patent
Chakrabarty et al.

(10) Patent No.: US 12,769,989 B2
(45) Date of Patent: Oct. 20, 2026

(54) FAULT CRITICALITY ASSESSMENT USING NEURAL TWINS

(71) Applicant: Duke University, Durham, NC (US)

(72) Inventors: Krishnendu Chakrabarty, Durham, NC (US); Arjun Chaudhuri, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 1420 days.

(21) Appl. No.: 17/492,118

(22) Filed: Oct. 1, 2021

(65) Prior Publication Data

US 2023/0108103 A1 Apr. 6, 2023

(51) Int. Cl.

*G06N 3/08* (2023.01)
*G06F 18/243* (2023.01)
*G06N 3/063* (2023.01)
*G06N 5/01* (2023.01)

(52) U.S. Cl.

CPC ....... *G06N 3/063* (2013.01); *G06F 18/24323* (2023.01); *G06N 3/08* (2013.01); *G06N 5/01* (2023.01)

(58) Field of Classification Search

CPC ............ G06N 3/063; G06N 3/08; G06N 5/01; G06N 3/048; G06N 3/084; G06N 3/09; G06N 3/045; G06F 18/24323

See application file for complete search history.

(56) References Cited

U.S. PATENT DOCUMENTS

| | | | | |
|---|---|---|---|---|
| 11,353,511 | B1 * | 6/2022 | Petter | B64D 45/00 |
| 11,606,265 | B2 * | 3/2023 | Dechene | H04L 41/16 |
| 2017/0103298 | A1 * | 4/2017 | Ling | G06N 3/063 |
| 2020/0040188 | A1 * | 2/2020 | Park | C09B 11/24 |
| 2020/0225655 | A1 * | 7/2020 | Cella | G05B 19/4184 |
| 2021/0157312 | A1 * | 5/2021 | Cella | G06Q 30/06 |
| 2022/0100943 | A1 * | 3/2022 | Oguni | G06F 30/367 |
| 2024/0172001 | A1 * | 5/2024 | Farooq | G06N 3/0464 |

OTHER PUBLICATIONS

Lapotin, David P., Toufie R. Mazzawy, and Marlin L. White. "Early package analysis: considerations and case study." Computer 26.4 (1993): 30-39.*

Wang, Shengjie, Tianyi Zhou, and Jeff Bilmes. "Bias also matters: Bias attribution for deep neural network explanation." International Conference on Machine Learning. PMLR, 2019.*

(Continued)

*Primary Examiner* — David Yi
*Assistant Examiner* — Devan Kapoor
(74) *Attorney, Agent, or Firm* — Talem IP Law, LLP

(57) ABSTRACT

A method of fault criticality assessment using neural twins includes converting a netlist into a neural twin by replacing each circuit element of the netlist with a neural-network-readable cell equivalent; and replacing each wire with a neural connection. Bias value adders are inserted at locations in the neural twin; and these bias value adders are used to apply a bias that represents a perturbation in the signal propagated by that connection. For each perturbed bias at a corresponding site selected to be perturbed, a loss value is calculated for the neural twin; and the site is classified, using a neural-twin-trained classifier, as critical or benign based on that loss value.

20 Claims, 7 Drawing Sheets

(56) References Cited

OTHER PUBLICATIONS

Azimi, Sarah, Annarita Moramarco, and Luca Sterpone. "Reliability evaluation of heterogeneous systems-on-chip for automotive ECUs." 2017 IEEE 26th International Symposium on Industrial Electronics (ISIE). IEEE, 2017.*

Ghosh, Shalini, and F. Joel Ferguson. "Estimating detection probability of interconnect opens using stuck-at tests." Proceedings of the 14th ACM Great Lakes symposium on VLSI. 2004.*

M. S. Ansari, B. F. Cockburn and J. Han, "An Improved Logarithmic Multiplier for Energy-Efficient Neural Computing," in IEEE Transactions on Computers, vol. 70, No. 4, pp. 614-625, Apr. 1, 2021, doi: 10.1109/TC.2020.2992113. keywords: {Artificial neural networks;Hardware;Adders;Neurons;Biological neural networks;T.*

A. B. Chowdhury, B. Tan, S. Garg and R. Karri, "Robust Deep Learning for IC Test Problems," in IEEE Transactions on Computer-Aided Design of Integrated Circuits and Systems, vol. 41, No. 1, pp. 183-195, Jan. 2022, doi: 10.1109/TCAD.2021.3054808. keywords: {Integrated circuits;Integrated circuit modeling;Measuremen.*

Meijer, Peter BL. "Neural networks for device and circuit modelling." Scientific Computing in Electrical Engineering: Proceedings of the 3rd International Workshop, Aug. 20-23, 2000, Warnemünde, Germany. Berlin, Heidelberg: Springer Berlin Heidelberg, 2001.*

LaPotin, David P., Toufie R. Mazzawy, and Marlin L. White. "Early package analysis: considerations and case study." Computer u 26.4 (1993}: 30-39.*

Wang, Shengjie, Tianyi Zhou, and Jeff Bilmes. "Bias also matters: Bias attribution for deep neural network explanation." V International Conference on Machine Learning. PMLR, 2019.*

Azimi, Sarah, Annarita Moramarco, and Luca Sterpone. "Reliability evaluation of heterogeneous systems-on-chip for automotive w ECUs." 2017 IEEE 26th International Symposium on Industrial Electronics (ISIE). IEEE, 2017.*

Umuroglu, Yaman, et al. "LogicNets: Co-Designed Neural Networks and Circuits for Extreme-Throughput Applications." arXiv, Apr. 6, 2020, arXiv:2004.03021, doi: 10.48550/arXiv.2004.03021. arXiv, https://arxiv.org/abs/2004.03021.*

Lee, Matthew Kay Fei, et al. "A System-Level Simulator for RRAM-Based Neuromorphic Computing Chips." ACM Transactions on Architecture and Code Optimization, vol. 15, No. 4, Article 64, Jan. 2019, doi:10.1145/3291054.*

Sartekin, Namik Kemal, and Ibrahim Sahin. "A Data Path Design Tool for Automatically Mapping Artificial Neural Networks on to FPGA-Based Systems." Journal of Electrical Engineering & Technology, vol. 11, No. 5, 2016, pp. 1466-1474, doi:10.5370/JEET.2016.11.5.1466.*

Loh, Wei-Yin, "Classification and Regression Trees," WIREs Data Mining and Knowledge Discovery, Jan. 6, 2011, pp. 14-23, vol. 1, issue 1.

Deng, Jia, et al., "ImageNet: A large-scale hierarchical image database," 2009 IEEE Conference on Computer Vision and Pattern Recognition, Jun. 2009, 8 pages.

Sze, Vivienne, et al., "Efficient Processing of Deep Neural Networks: A Tutorial and Survey," Proceedings of the IEEE, Nov. 20, 2017 (Accessible: Aug. 13, 2017), 32 pages, vol. 105, issue 12.

Guo, Xinyu, et al., "A Systolic Array-Based FPGA Parallel Architecture for the BLAST Algorithm," ISRN Bioinformatics, Sep. 4, 2012, pp. 1-11, vol. 2012, article 195658.

Samajdar, Ananda, et al., "SCALE-Sim: Systolic CNN Accelerator Simulator," Feb. 2, 2019 (accessible: Oct. 16, 2018), 11 pages, arXiv.

Google, "Google Edge TPU: Coral AI," 2020, Retrieved: Nov. 14, 2023, Retrieved from: https://coral.ai/, 11 pages.

Jouppi, Norman P., et al., "In-Datacenter Performance Analysis of a Tensor Processing Unit," Proceedings of the 44th Annual International Symposium on Computer Architecture, Jun. 24, 2017, pp. 1-12, ACM, Toronto ON Canada.

Lu, Wenyan, et al., "FlexFlow: A Flexible Dataflow Accelerator Architecture for Convolutional Neural Networks," 2017 IEEE International Symposium on High Performance Computer Architecture (HPCA), Feb. 2017, pp. 553-564, IEEE, Austin, TX.

Chen, Yu-Hsin, et al., "Eyeriss: An Energy-Efficient Reconfigurable Accelerator for Deep Convolutional Neural Networks," IEEE Journal of Solid-State Circuits, Jan. 2017 (accessible Nov. 8, 2016), pp. 262-264, vol. 52, issue 1.

Reagen, Brandon, et al., "Ares: a framework for quantifying the resilience of deep neural networks," Proceedings of the 55th Annual Design Automation Conference, Jun. 24, 2018, 6 pages, ACM, San Francisco, California.

Li, Guanpeng, et al., "Understanding error propagation in deep learning neural network (DNN) accelerators and applications," Proceedings of the International Conference for High Performance Computing, Networking, Storage and Analysis, Nov. 12, 2017, 12 pages, ACM, Denver Colorado.

Zhang, Jeff Jun, et al., "Analyzing and mitigating the impact of permanent faults on a systolic array based neural network accelerator," 2018 IEEE 36th VLSI Test Symposium (VTS), Apr. 2018 (accessible: Feb. 17, 2018), pp. 1-6, IEEE, San Francisco, CA.

Kundu, Shamik, et al., "Toward Functional Safety of Systolic Array-Based Deep Learning Hardware Accelerators," IEEE Transactions on Very Large Scale Integration (VLSI) Systems, Mar. 2021, pp. 485-498, vol. 29, issue 3.

Chaudhuri, Arjun, et al., "C-Testing of AI Accelerators," 2020 IEEE 29th Asian Test Symposium (ATS), Nov. 23, 2020, pp. 1-6, IEEE, Penang, Malaysia.

Gebregiorgis, Anteneh, et al., "Testing of Neuromorphic Circuits: Structural vs Functional," 2019 IEEE International Test Conference (ITC), Nov. 2019, 10 pages, IEEE, Washington DC, USA.

Sadi, Mehdi, et al., "Test and Yield Loss Reduction of AI and Deep Learning Accelerators," IEEE Transactions on Computer-Aided Design of Integrated Circuits and Systems, Jan. 2022, pp. 104-115, vol. 41, issue 1.

Chaudhuri, Arjun, et al., "Functional Criticality Classification of Structural Faults in AI Accelerators," 2020 IEEE International Test Conference (ITC), Nov. 1, 2020, pp. 1-5, IEEE, Washington DC, USA.

Chaudhuri, Arjun, et al., "Fault-Criticality Assessment for AI Accelerators using Graph Convolutional Networks," 2021 Design, Automation & Test in Europe Conference & Exhibition (DATE), Feb. 1, 2021, pp. 1596-1599, IEEE, Grenoble, France.

Negri, Elisa, et al., "A Review of the Roles of Digital Twin in CPS-based Production Systems," Procedia Manufacturing, Jun. 2017, pp. 939-948, vol. 11.

Lecun, Y., et al., "Gradient-based learning applied to document recognition," Proceedings of the IEEE, Nov. 1998, pp. 2278-2324, vol. 86, issue 11.

Chen, Ching-Yuan, et al., "Efficient Identification of Critical Faults in Memristor Crossbars for Deep Neural Networks," 2021 Design, Automation & Test in Europe Conference & Exhibition (DATE), Feb. 1, 2021, pp. 1074-1077, IEEE, Grenoble, France.

* cited by examiner

| Features | | Label ($z_{out}$) |
|---|---|---|
| $z_1 \in [0, \Delta_n]$ | $z_2 \in [0, \Delta_n]$ | 0 |
| $z_1 \in [0, \Delta_n]$ | $z_2 \in [1 - \Delta_n, 1]$ | 0 |
| $z_1 \in [1 - \Delta_n, 1]$ | $z_2 \in [0, \Delta_n]$ | 0 |
| $z_1 \in [1 - \Delta_n, 1]$ | $z_2 \in [1 - \Delta_n, 1]$ | 1 |

| Features | Label ($z_{out}$) |
|---|---|
| $z \in [0, \Delta_n]$ | 1 |
| $z \in [1 - \Delta_n, 1]$ | 0 |

Function $\phi_{nt}(z_1, z_2)$:

$var_1 = clp(z_1 + bias_1);$ $var_2 = clp(z_2 + bias_2);$ $var_3 = clp(\phi_{AND2}(var_1, var_2) + bias_3);$ $var_4 = clp(\phi_{OR2}(var_1, var_2) + bias_4);$ $var_5 = clp(\phi_{XOR}(var_1, var_2) + bias_5);$ $var_6 = clp(\phi_{FA,S}(var_3, var_4, var_5) + bias_6);$ $var_7 = clp(\phi_{FA,CO}(var_3, var_4, var_5) + bias_7);$ $var_8 = clp(\phi_{BUF}(var_6) + bias_8);$ $var_9 = clp(\phi_{INV}(var_6) + bias_9);$ $var_{10} = clp(\phi_{BUF}(var_7) + bias_{10});$ $var_{11} = clp(\phi_{INV}(var_8) + bias_{11});$ $var_{12} = clp(\phi_{NOR2}(var_9, var_{10}) + bias_{12});$ $z_{out} = clp(\phi_{XNOR}(var_{11}, var_{12}) + bias_{13});$ return $z_{out}$;

Figure 6

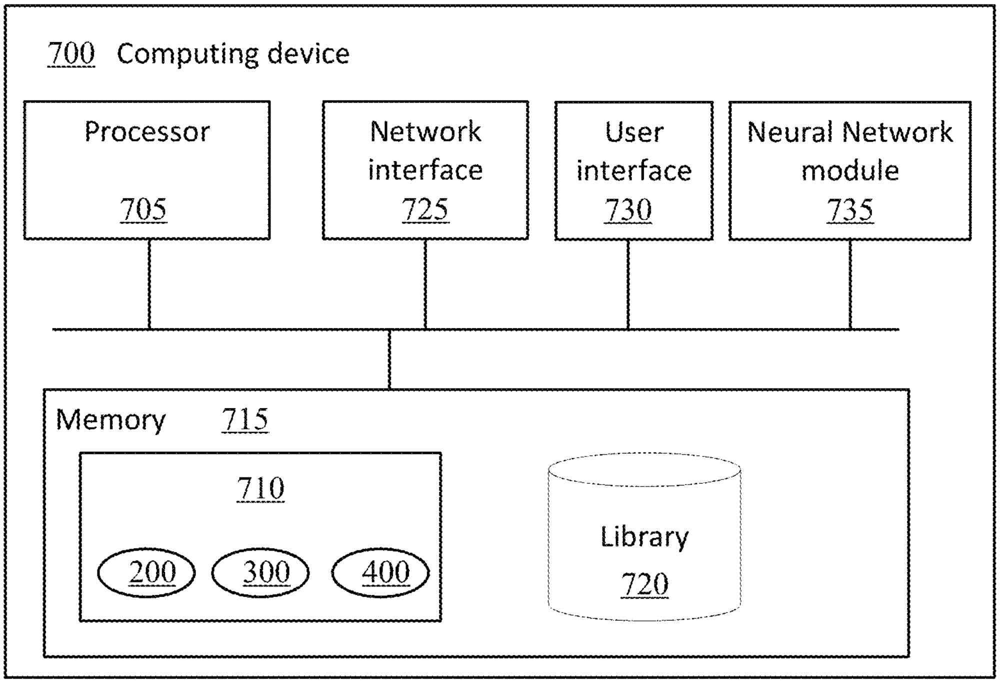

Figure 7

| Framework | $f$ (%) | 16-bit PE | | 32-bit PE | |
|---|---|---|---|---|---|
| | | $A_c$ (%) | $M_c$ (%) | $A_c$ (%) | $M_c$ (%) |
| Neural twin + DT | 2 | 97.4 (5.3) | 5.1 (2.1) | 94.3 (1.07) | 13.3 (1.3) |
| Neural twin + DT | 5 | 100 (0) | 0 (0) | 98.9 (0.3) | 3.5 (0.7) |
| Neural twin + DT | 8 | 100 (0) | 0 (0) | 100 (0) | 0 (0) |
| Neural twin + DT | 10 | 100 (0) | 0 (0) | 100 (0) | 0 (0) |

Figure 8

FAULT CRITICALITY ASSESSMENT USING NEURAL TWINS

BACKGROUND

Advances in deep neural networks (DNNs) are driving the demand for domain-specific accelerators, including for data-intensive applications such as image classification and segmentation, voice recognition, and natural language processing. The ubiquitous application of DNNs has led to a rise in demand for custom artificial intelligence (AI) accelerators. Many such use-cases, including autonomous driving, require high reliability. Built-in self-test (BIST) can be used for enabling power-on self-test in order to detect in-field failures. However, DNN inferencing applications such as image classification are inherently fault-tolerant with respect to structural faults; it has been shown that many faults are not functionally critical, i.e., they do not lead to any significant error in inferencing. As a result, conventional pseudo-random pattern generation for targeting all faults with BIST is an "over-kill". Therefore, it can be desirable to identify which nodes are critical for in-field testing to reduce overhead.

Functional fault testing is commonly performed during design verification of a circuit to determine how resistant a circuit architecture is to errors manifesting from manufacturing defects, aging, wear-out, and parametric variations in the circuit. Each node can be tested by manually injecting a fault to determine whether that node is functionally critical—in other words, whether it changes a terminal output (i.e., an output for the circuit architecture as a whole) for one or more terminal inputs (i.e., an input for the circuit architecture as a whole). Indeed, the functional criticality of a fault is determined by the severity of its impact on functional performance. If the node is determined to be critical, it can often degrade circuit performance or, in certain cases, eliminate functionality. Fault simulation of an entire neural network hardware architecture to determine the critical nodes is computationally expensive—taking days, months, years, or longer—due to large models and input data size. Therefore, it is desirable to identify mechanisms to reduce the time and computation expense of evaluating fault criticality while maintaining the accuracy of criticality evaluation. Brute-force fault simulation for determining fault criticality is computationally expensive due to many potential fault sites in the accelerator array and the dependence of criticality characterization of processing elements (PEs) on the functional input data. Supervised learning techniques can be used to accurately estimate fault criticality, but it requires ground truth for model training. The ground-truth collection involves extensive and computationally expensive fault simulations.

Therefore, there continues to be a need in the art for mechanisms to determine fault criticality of nodes in circuits such as for DNNs.

BRIEF SUMMARY

Fault criticality assessment using neural twins is provided. Techniques and systems are provided that can predict criticality of faults with minimal ground-truth data functional fault simulation.

A method of fault criticality assessment using neural twins includes converting a netlist into a neural twin by replacing each circuit element of the netlist with a neural-network-readable cell equivalent; and replacing each wire with a neural connection. Bias value adders are inserted at locations in the neural twin; and these bias value adders are used to apply a bias that represents a perturbation in the signal propagated by that connection. For each perturbed bias at a corresponding site selected to be perturbed, a loss value is calculated for the neural twin; and the site is classified, using a neural-twin-trained classifier, as critical or benign based on that loss value.

In some cases, the particular perturbed bias applied at each corresponding site selected to be perturbed involves determining a sign of a bias sensitivity computed for that selected site; if the sign is determined to be positive, applying a first bias corresponding to a stuck-at-one fault; and if the sign is determined to be negative, applying a second bias corresponding to a stuck-at-zero fault. By using the sign of bias sensitivity to determine the fault type for injection and simulation, it is possible to identify more critical fault locations using fewer fault simulation runs compared to a scenario where one injects both stuck-at fault types to determine which type results in a critical functional fault.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 shows a potential mathematical representation of the neural twin of FIG. 1C.

FIG. 7 shows a system for performing fault criticality analysis using a neural twin.

FIG. 8 shows experimental results for fault criticality analysis using a neural twin.

DETAILED DESCRIPTION

Figure 1A:
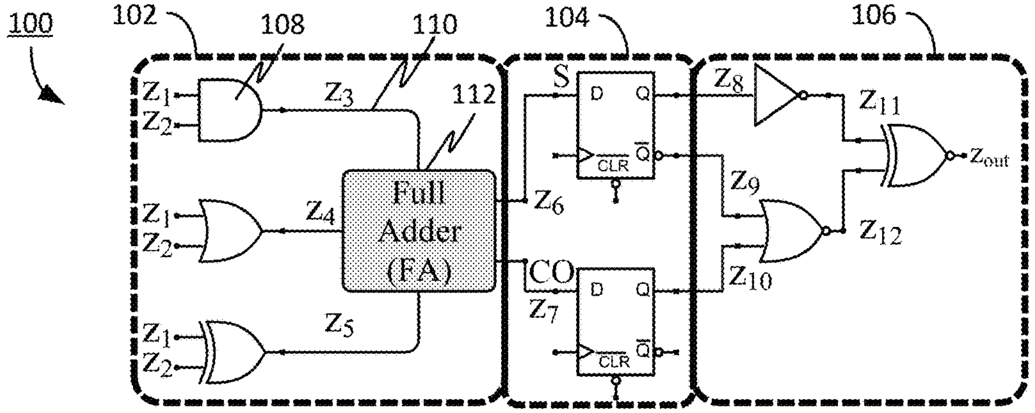
FIGS. 1A-1C illustrate a process that transforms a netlist into its neural twin for fault criticality assessment.

Fault criticality assessment using neural twins is provided. Techniques and systems are provided that can predict criticality of faults with minimal ground-truth data functional fault simulation.

Neural twins are a promising tool that can be used to approximate circuits and test the circuit using far less computationally expensive hardware and methodologies. Furthermore, neural twins are end-to-end differentiable, allow backpropagation, and are fast inferencing. As the name implies, neural twins incorporate gate-level structural and functional information of the circuit to be tested to create approximations of the circuit to be tested that are more easily analyzed by computers, especially neural networks. Thus, a software simulator of a physical system is used to accelerate the analysis of the physical system.

The fault criticality assessment of structural faults using neural twins involves modeling of a neural twin for a particular circuit, modeling of neural-network-readable cell equivalents used for neural twins, training of the neural twin for evaluating functional fault criticality, and classifier training for the classifier used to classify fault criticality when evaluating fault criticality using a neural twin.

It should be understood that a structural fault is considered functionally critical if the structural fault leads to functional failure. For example, a functional failure can be evaluated in terms of the fault's impact on inferencing accuracy (for the inferencing use-case). A fault can be deemed to be benign if the fault does not affect the inferencing accuracy (for the inferencing use-case).

A method of fault criticality assessment using neural twins can include selecting sites at a neural twin of a particular netlist for perturbation of bias by computing a bias sensitivity of potential fault sites and selecting a number of fault sites as the selected sites according to the computed bias sensitivity; applying the perturbation of bias to each selected site via a corresponding bias value adder located in the neural twin; calculating a loss value for the neural twin corresponding to the application of the perturbation of bias for each selected site; and classifying, using a neural-twin-trained classifier, a particular site of the selected sites as critical or benign based on the loss value from perturbing the bias at that site. The resulting sites that are classified as critical can then be used in test generation and fault simulation software programs. Indeed, the sites classified as critical nodes can be used for applications of automatic test pattern generation (ATPG), a design for test application (e.g., for BIST), and test point insertion.

The described fault criticality assessment can be used in generating fault testing schemes for any application target. That is, a variety of circuits and their use-cases can be evaluated. These circuits can include any processing architecture (e.g., a systolic array of processing units) and associated deep learning application(s), including those used for training and inferencing. Examples include deep neural networks for image classification and segmentation (with applications to autonomous driving, manufacturing automation, and medical diagnostics as some examples), regression, voice recognition, and natural language processing.

The described fault criticality assessment can identify predicted critical nodes and these predicted critical nodes can be used in creating testing methodologies to determine if a particular instance of the circuit architecture can be used in a certain application, especially in the context of circuit architectures for neural networks.

By identifying the critical nodes, the testing methodologies for fault testing can be applied to those nodes identified by the described fault criticality assessment. By determining where critical nodes exist with further knowledge of what terminal outputs are necessary, a testing methodology can be created to ensure that the particular instance of the circuit architecture can be used for that certain application as well as the extent that testing must be performed (or extent of infrastructure on a chip is needed to be added such as for BIST). Testing can be useful both before deployment and after deployment to ensure continued functionality.

Advantageously, fewer computational resources (and corresponding time and/or chip area) are required to carry out functional fault testing.

Figure 1B:
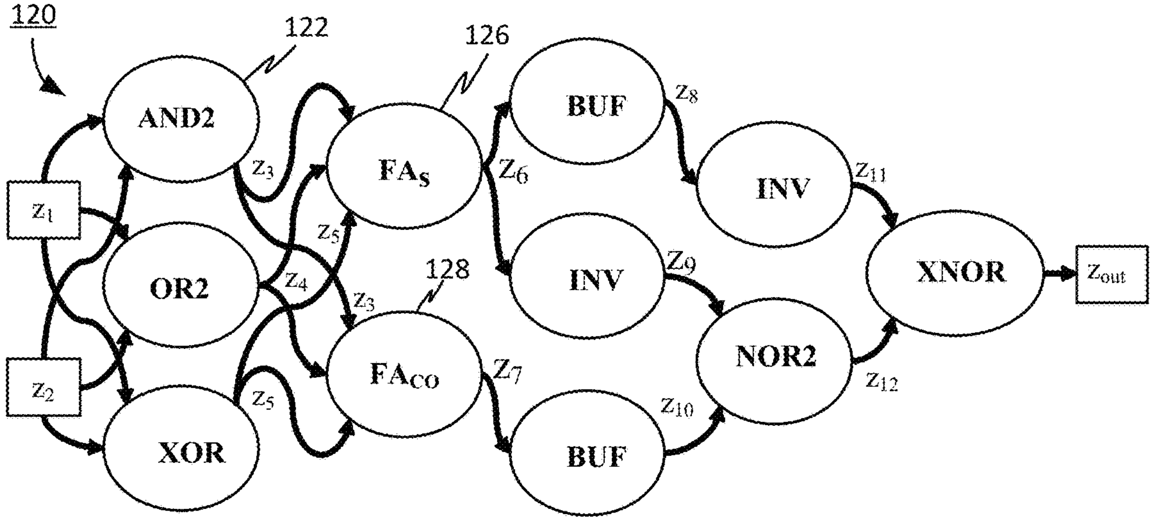
Figure 1C:
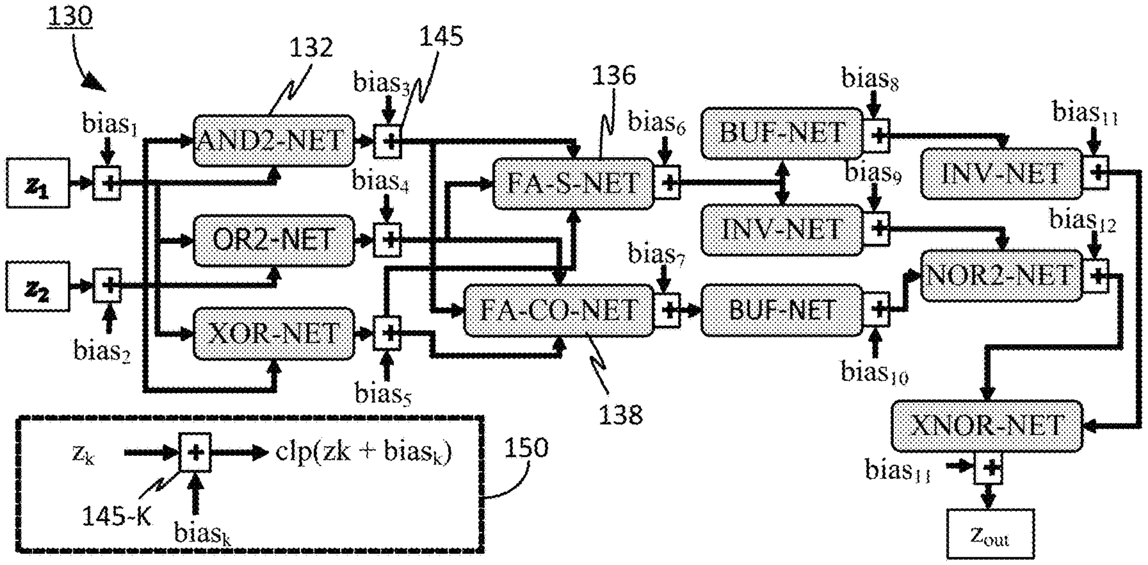

FIGS. 1A-1C illustrate a process that transforms a netlist into its neural twin for fault criticality assessment. The modeling of a neural twin for a particular circuit can be carried out by the process reflected by FIGS. 1A-1C. FIG. 1A shows a representative circuit 100 of example simplified processing unit that includes combinational logic 102, pipelining 104, and combinational logic 106. A circuit, such as circuit 100, can be represented by a graph 120 as shown in FIG. 1B and modeled with a neural twin 130 as shown in FIG. 1C. As will be described in more detail with respect to FIG. 2, a netlist of circuit 100 can be converted to a neural twin 130 by replacing each circuit element of the netlist with a neural-network-readable cell equivalent; and replacing each wire with a neural connection. With reference to FIGS. 1A and 1B, every cell instance in the netlist (e.g., of circuit 100) is replaced by a vertex that is indicated by the corresponding standard cell and a wire connecting two standard cell instances in the netlist is mapped as an edge between corresponding vertices (e.g., resulting in neural connection between two neural-network-readable cell equivalents shown in FIG. 1C).

For example, referring to FIGS. 1A-1C, a two-input AND gate 108 of circuit 100 is represented in graph 120 as vertex $AND_2$ 122, which is replaced with the neural-network-readable cell equivalent, $AND_2$-NET 132 in the neural twin 130, and the wire Z3 110 connecting the two-input AND gate 108 to the next cell instance (e.g., Full Adder 112) can be replaced with an edge representing a neural connection to the subsequent vertex/neural-network-readable cell equivalent.

In the illustrative example, Full Adder 112, which is a combinational gate with multiple outputs, is converted/mapped to multiple neural-network-readable cell equivalents that share the same inputs as the original gate but that each have a different single output. For example, consider a Full Adder (S,CO)=FA(A,B,C) with inputs A, B, and C, and outputs S (sum) and CO (carry-out). The Full Adder 112 is replaced by two vertices (126, 128) in the graph 120 and corresponding neural-network-readable cell equivalents in the neural twin 130: S=FAs(A,B,C) and CO=FAco(A,B,C). Here, A, B, and C are inputs shared by both FAs 126 and FAco 128; S and CO are the outputs of FAs and FAco, respectively. FAs 126 and FAco 128 are replaced with FA-S-NET 136 and FA-CO-NET 138 in the neural twin 130.

Combinational logic of a two-input OR gate, a two-input XOR gate, two-input NOR gate, and a two-input XNOR gate are also replaced by the neural-network-readable cell equivalents (vertices labeled in FIG. 1B as $OR_2$, XOR, $NOR_2$, and XNOR, respectively; and neural-network-readable cell equivalents labeled in FIG. 1C as $OR_2$-NET, XOR-NET, $NOR_2$-NET, and XNOR-NET, respectively).

Since the neural twin 130 is intended to model the combinational logic (e.g., combinational logic 102 and combinational logic 106), the flip-flops in the pipelining 104 are replaced with buffers and inverters during the netlist-to-neural twin conversion. In the illustrative embodiment, let (Q,QN)=DFF(D,clk) indicate a flop with inputs D and clk (clock), and outputs Q and QN. The flop DFF is replaced by a buffer Q=BUF(D) and an inverter QN=INV(D). Here, D is tied to the inputs of both BUF and INV; Q and QN are the outputs of BUF and INV, respectively. In this way, it can be ensured that no sequential elements are present in the neural twin 130. In the illustrative example, it can be seen that each flip-flop is replaced with both a buffer and an inverter when both of those outputs connect to another cell; however, if only the Q output is used to connect to another cell, the flip-flop is replaced by only a buffer ("BUF"). Similarly, if only the QN output is used to connect to another cell, the flip-flop would be replaced by just an inverter ("INV").

The neural-network-readable cell equivalents used to replace the various gates and other components of the circuit 100 may be obtained from a library of neural-network-readable cell equivalents of standard cells. The library may be associated with the program performing the conversion.

Figure 5A:
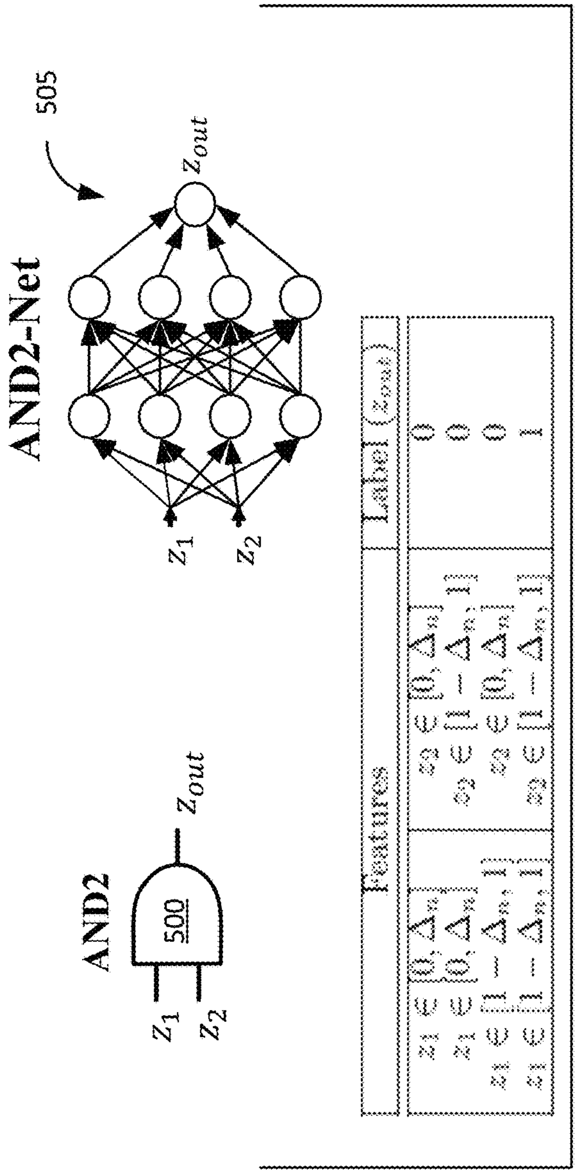
FIGS. 5A-5C show an example implementation of neural-network-readable cell equivalent representations for use in neural twins.
Figure 5B:
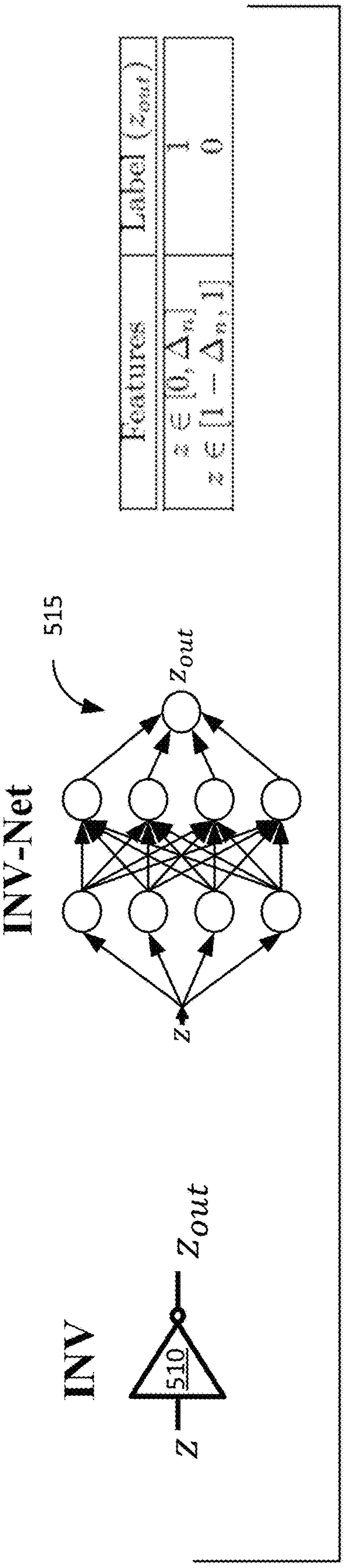
Figure 5C:
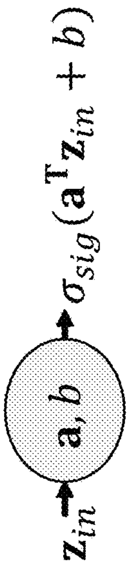

An example process of creating/modeling neural-network-readable cell equivalents (with a corresponding example implementation of a neural network representation) is described with respect to FIGS. 5A-5C.

Turning to FIG. 1C, to use the neural twin for fault criticality assessment, bias value adders 145 are inserted at locations in the neural twin 130. Bias value adders 145 can specifically be located at each output of a neural-network-readable cell equivalent. Training of the neural twin 130 for evaluating fault criticality is described with respect to FIGS. 2 and 3 and classifier training for an example classifier used to classify fault criticality when evaluating fault criticality using a neural twin is described in detail with respect to FIG. 4.

The neural twin 130 network architecture is based on the topology of the graph 120 such that there exists a one-to-one physical correspondence between each wire (or fault site) in the netlist of circuit 100 and a neural connection in the neural twin 130 network. A bias, applied at the bias value adders 145, is associated with every neural connection between two neural-network-readable cell equivalents.

Bias value adders 145 are used to modify electrical characteristics at a particular point and the bias applied at a bias value adder 145 represents a perturbation in the signal being propagated along a neural connection. As shown by the legend 150, the output signal Zk of a neural-network-readable cell equivalent k is summed at bias value adder 145-K with a corresponding bias, biask. Since the network is modeled to have Boolean logic functional behavior, an activation function is used to constrain the summed value between 0 and 1, given as clp(zk+biask).

Figure 2:
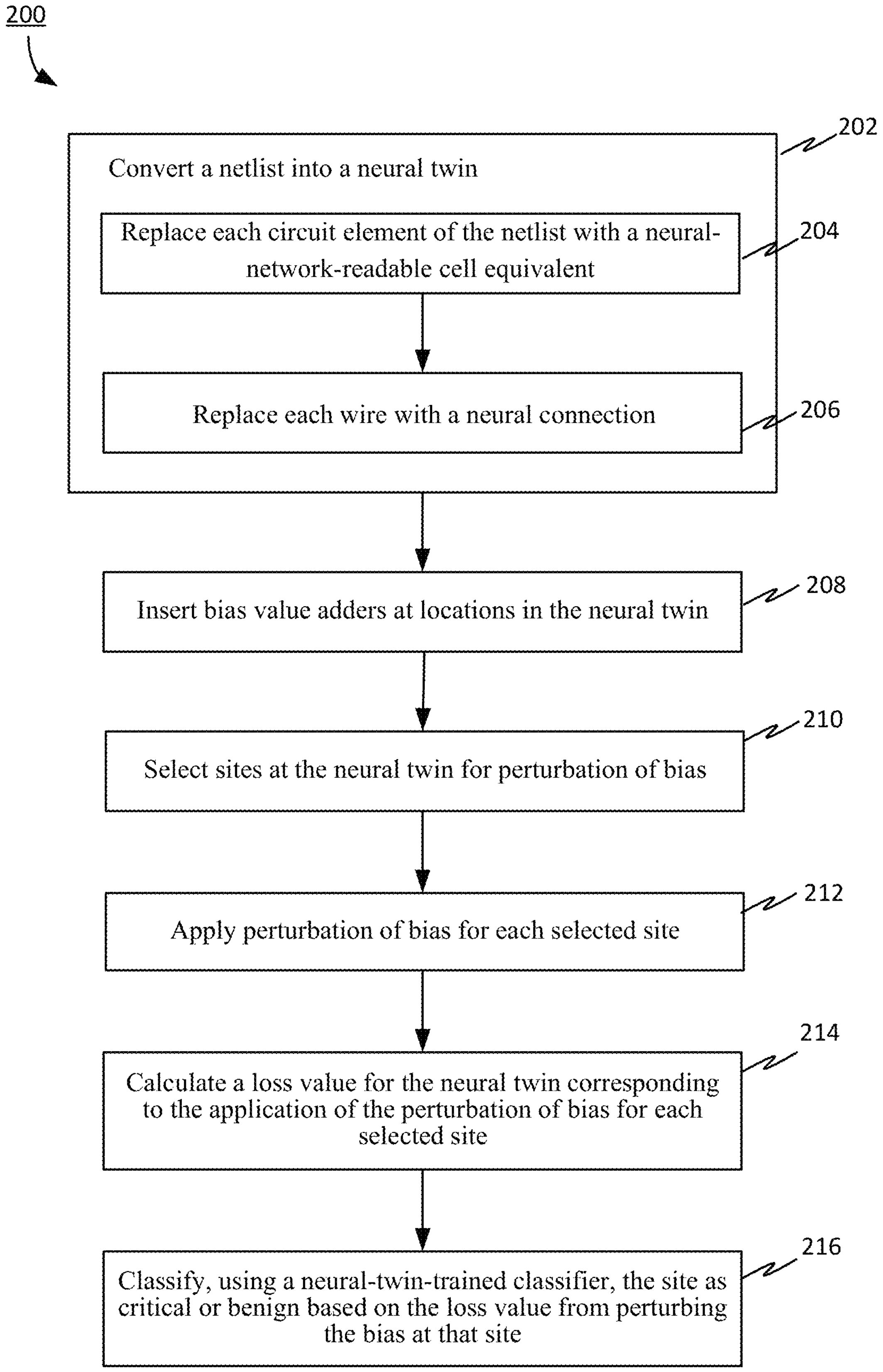
FIG. 2 illustrates a method of fault criticality analysis using a neural twin.

The fault criticality analysis using the neural twin 130 is described with respect to FIG. 2. Indeed, as will be described in more detail with respect to FIG. 2, the bias value adders 145 can allow a tester to introduce bias into the circuit to simulate faults at one or more fault sites. For example, a stuck-at-one fault can be simulated by applying a value of 1 as the bias at a bias value adder 145 (and clipping according to the activation function). Similarly, a stuck-at-zero fault can be simulated by applying a value of −1 as the bias at the bias value adder 145 (and clipping according to the activation function). Individual bias value adders allow a tester to test one or more potential fault sites independently or as a group. Normal circuit functionality can be simulated by adding a 0 to the output of the neural-network-readable cell equivalent node.

FIG. 2 illustrates a method of fault criticality analysis using a neural twin. Referring to FIG. 2, method 200 includes converting (202) a netlist into a neural twin. The netlist describes the connectivity of a circuit and may be in a format such as Verilog, VHDL, Spice, or other languages that can be synthesized and used by electronic design automation tools (e.g., before manufacturing preparation). The netlist can be of any hardware architecture and advantageously can be of an AI accelerator such as those designed for image processing. The process of converting (202) the netlist into a neural twin can be carried out such as described with respect to FIGS. 1A-1C, for example, by replacing (204) each circuit element of the netlist with a neural-network-readable cell equivalent and replacing (206) each wire with a neural connection. In some cases, replacing (204) each circuit element of the netlist with a neural-network-readable cell equivalent includes converting the netlist to a graph and assigning appropriate neural-network-readable cell equivalents to each vertex of the graph. The neural-network-readable cell equivalents can be obtained from a library of previously generated models. In some cases, a model may be generated at the time that the model is needed for a particular neural twin. Behavior, training, and examples of neural-network-readable cell equivalents are described with respect to FIGS. 5A-5C. As described in more detail with respect to FIGS. 5A-5C, a particular neural-network-readable cell equivalent can be generated by training a neural network using a truth table for a corresponding circuit element. The neural network can be any suitable structure with any suitable number of neurons. A nine-neuron network with three fully connected layers is shown in the example implementation of FIGS. 5A and 5B; however, more or fewer neurons and layers may be used.

Method 200 includes inserting (208) bias value adders at locations in the neural twin. Bias value adders can be inserted, for example, at an output of each of the neural-network-readable cell equivalents. Bias values can be initialized by a training process of the neural twin network (e.g., with a fault-free dataflow). The resulting neural twin network can then be used for fault criticality assessment.

Indeed, the method 200 includes selecting (210) sites at the neural twin for perturbation of bias. Selecting (210) the sites at the neural twin for perturbation of bias can be accomplished by computing a bias sensitivity of potential fault sites and selecting a number of fault sites according to the computed bias sensitivity. For example, the output of every circuit element can be considered a potential fault site; and, once all the bias sensitivities are calculated, a predetermined number (or other criteria) of fault sites having the largest bias sensitivities can be selected as the sites for the perturbation of bias.

In an example implementation, a misclassification-driven training (MDT) is used to calculate bias sensitivities and determine the sites to select. It should be understood that other methods, including various geometrical and statistical approaches, can be used to calculate bias sensitivities and determine the sites to select. For the example implementation described here, the MDT process can first begin with considering a fault-free functional dataflow through the circuit across inferencing cycles for a given application workload (e.g., images for an image classifier circuit). The neural twin network performs the fault-free functional dataflow and an approximation-loss value is computed, referred to herein as a fault-free loss value. The fault-free loss value represents the loss of the system when all biases are set to 0 (i.e., no stuck-at-one or stuck-at-zero faults perturbed in the system). The system performing the MDT can receive the fault-free loss value generated for the fault-free neural twin. During processes performed with respect to the fault-free neural twin, bias values (biask of FIG. 1C) can be computed, for example, by backpropagating the loss function value.

The following pseudocode illustrates an example procedure for obtaining the biask values for a processing element circuit, where $$\phi_{nt}^{PE}$$

refers to the mathematical representation of the neural twin of a particular processing element circuit (see e.g., FIG. 6), $\mathcal{D}$ is the dataset of a given application workload, bs is batch size for the dataset, $\mathcal{L}_{ps}$ is the approximation-loss value, MSE refers to the mean-squared-error function, $$y_{r,c,i}^{ps}$$

is the floating-pint partial-sum output of the processing element (given as PE(r,c)) in the i-th inferencing cycle.

---

Input: $\phi_{nt}^{PE}$, $\mathcal{D}$, bs
Output: $\{bias_k\}$ ← optimized biases of neural twin
Randomly initialize $\{bias_k\}$;
for epoch ≤ $N_{epoch}$ do
| c ← 1, $_{ps}$ ← 0;
| for $(D_{j,f}, y_{r,c,j}^{ps}) \in \mathcal{D}$ do
| | $\hat{y}_{r,c,j}^{ps} \leftarrow \phi_{nt}^{PE}(D_{j,f})$;
| | $\mathcal{L}_{ps} \leftarrow \mathcal{L}_{ps} + MSE(\hat{y}_{r,c,j}^{ps}, y_{r,c,j}^{ps})$, $c \leftarrow c + 1$;
| | if c > bs then
| | | backpropagate $(\mathcal{L}_{ps})$ to compute gradients $\left\{\frac{\partial \mathcal{L}_{ps}}{\partial bias_k}\right\}$; Update $\{bias_k\}$ based on
| | | computed gradients using learning rate lr, c ← 1, $_{ps}$ ← 0;
| | end
| end
| if $_{ps}$ > 0 then
| | backpropagate $(\mathcal{L}_{ps})$ to compute gradients $\left\{\frac{\partial \mathcal{L}_{ps}}{\partial bias_k}\right\}$; Update $\{bias_k\}$ based on
| | computed gradients using learning rate lr;
| end
end
return $\{bias_k\}$

---

Accordingly, the system performing the MDT can also receive the bias values biask for each site. For each site in the neural twin network (e.g., corresponding to each bias adder), a bias sensitivity can be calculated by taking a gradient of the loss value with respect to the corresponding bias. As mentioned above, this bias sensitivity is used to select (210) the sites at the neural twin for perturbation of bias. For example, every site having a bias sensitivity calculated is a potential fault site and the potential fault sites can be ranked by an absolute value of the gradient corresponding to each of the potential fault sites. After ranking, one or more of the potential fault sites can be selected as the selected sites to test based on a criteria (singular or plural) with respect to the ranked potential fault sites. Potential criteria that may be used include, but are not limited to, a certain number (e.g., predetermined) of potential fault sites (selected in ranked order from largest gradients/bias sensitivity to smallest gradients/bias sensitivity), a certain percentage of potential fault sites (e.g., indicating the certain number selected in ranked order), and all potential fault sites with a bias sensitivity above a certain value/threshold.

For each selected site (e.g., of the potential fault sites), a perturbation of bias is applied (212). The perturbation of bias is applied in a manner to maximize the loss value. In one implementation, the bias applied at a particular site is based on the sign of the bias sensitivity computed for the site. For example, the bias is applied according to the sign of the bias sensitivity. That is, to maximize the loss value for a perturbed bias, the sign indicates whether the stuck at one fault or the stuck at zero fault would result in a larger loss value. Accordingly, applying (212) the perturbation of bias to each selected site comprises, for each selected site, determining a sign of a bias sensitivity computed for that selected site; if the sign is determined to be positive, applying a first bias corresponding to a stuck-at-one fault; and if the sign is determined to be negative, applying a second bias corresponding to a stuck-at-zero fault. By using the sign of bias sensitivity to determine the fault type for injection and simulation, it is possible to identify more critical fault locations using fewer fault simulation runs compared to a scenario where one injects both stuck-at fault types to determine which type results in a critical functional fault. For example, the sign of the bias sensitivity for each site can be determined; and when the sign is negative, the bias is set to −1 and when the sign is positive, the bias is set to +1. As explained with respect to FIG. 1C, a clipping function is used as an activation function for the bias value adders; accordingly, even with a −1 or 1 applied as the bias, the signal propagated by the neural connection will be between 0 and 1. In some cases, one fault site (via its corresponding bias value adder) is perturbed with a bias at a time.

Using the bias configured as described above (e.g., for a stuck at one or a stuck at zero fault), the method includes calculating (214) a loss value for the neural twin corresponding to the application of the perturbation of bias for each selected site. Based on the loss value, a selected site can be classified (216) as either critical or benign using a neural-twin-trained classifier. The neural-twin-trained classifier can be, for example, a decision tree (DT). Training of a decision tree implementation can be performed with methods as described in FIG. 4.

Figure 3:
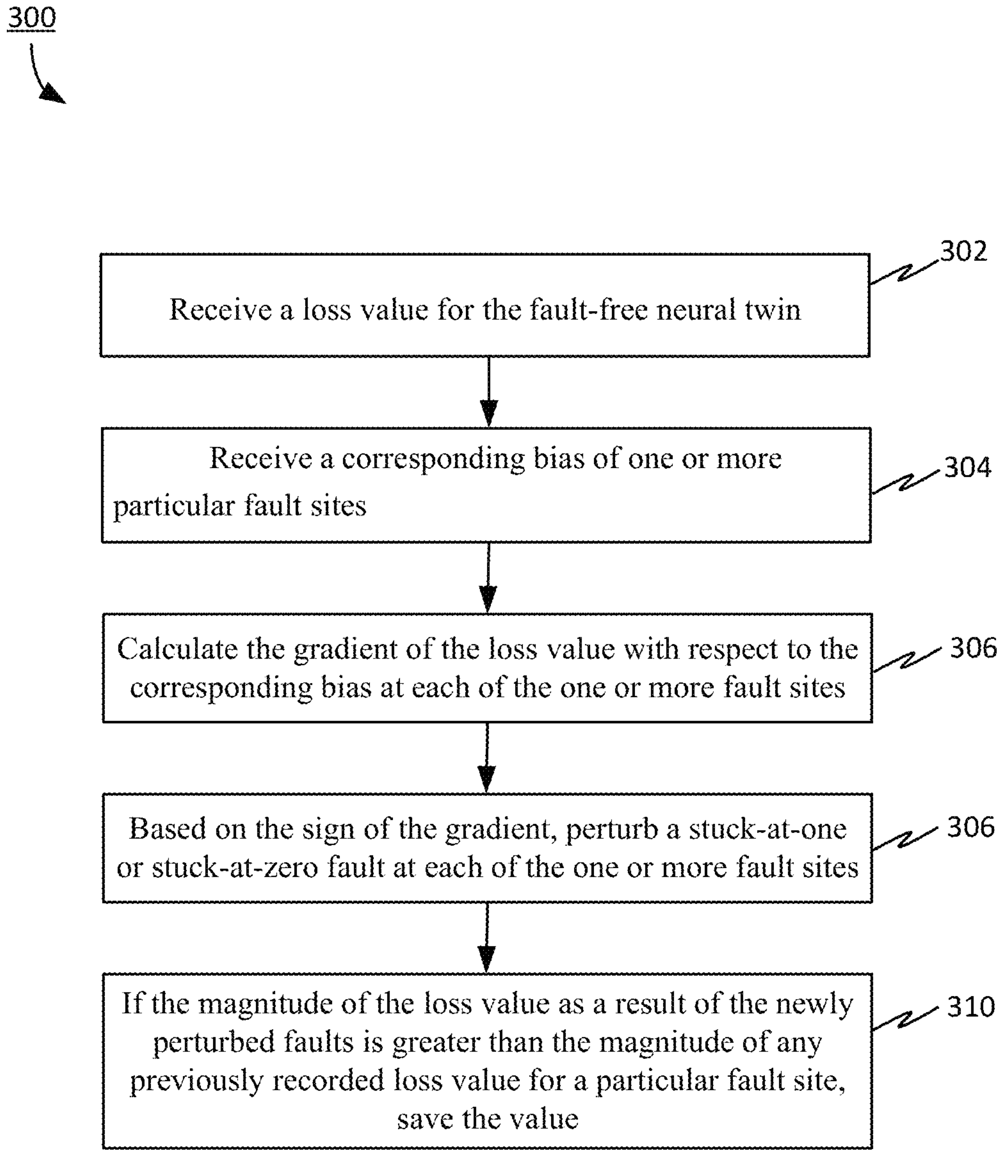
FIG. 3 shows a method of refining a neural twin using misclassification-driven training.

In some cases, the neural twin can be further refined during operation. That is, the bias values and the loss values can be updated not just as part of the original training of the neural twin, but also as a result of or after the selection process of potential fault sites. FIG. 3 shows a method of refining a neural twin using misclassification-driven training. Similar to processes described with respect to operations 210, 212, and 214 of FIG. 2, a refining method 300 can begin by receiving (302) a fault-free loss value for a fault-free neural twin and receiving (304) a corresponding bias of one or more particular fault sites. With the loss value for the fault-free neural twin and the corresponding bias from the one or more particular bias, a bias sensitivity can be calculated for each of the one or more particular fault sites by calculating (306) the gradient of the loss value with respect to the corresponding bias at each of the one or more fault sites. Based on the sign of the gradient, a stuck-at-one or stuck-at-zero fault can be perturbed (308) at each of the one or more fault sites. If the magnitude of the loss value as a result of the newly perturbed faults is greater than the magnitude of any previously recorded loss value for a particular fault site, then the value can be saved (310).

Figure 4:
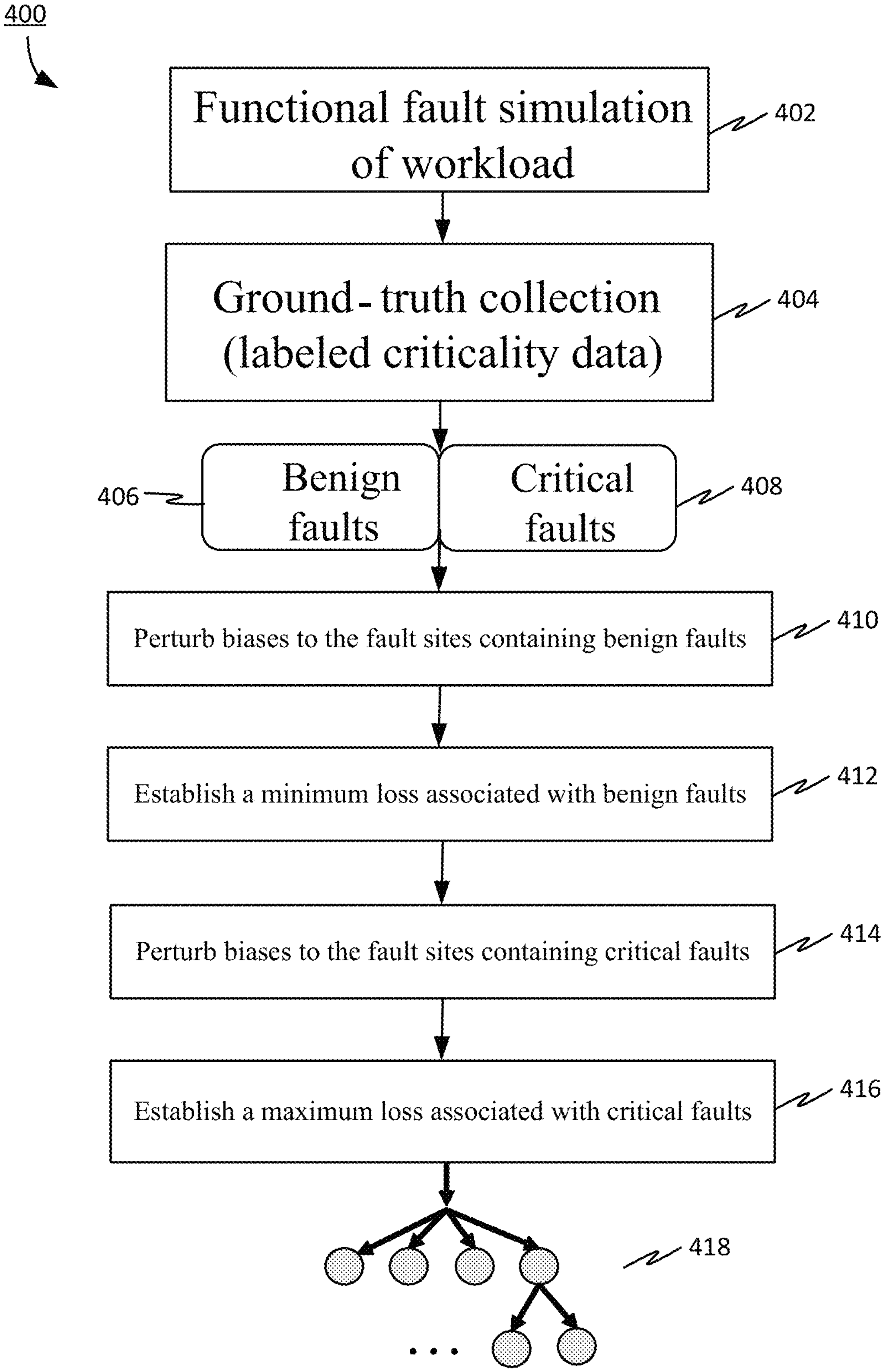
FIG. 4 illustrates a process flow diagram for training a decision tree for a particular neural twin.

FIG. 4 illustrates a process flow diagram for training a decision tree for a particular neural twin. The process 400 can begin with performing (402) a functional fault simulation of a portion of the netlist or one or more circuits corresponding to one or more netlists. Coverage of the functional fault simulation can be partial or entire. In some cases, for a processing element circuit (e.g., for a DNN), coverage can be as low as 2% or 8% depending on bit size of processing elements of the netlist. Based on the functional fault simulation, ground-truth data can be collected (404). The ground-truth data can be, for example, a set 406 of data that notates sites that contain benign faults and a set 408 of data that notates sites that contain critical faults.

Once ground-truth is established, a neural network representation (e.g., the particular neural twin) can be trained on the labeled ground-truth data set, including the set 406 of data that notates sites that contain benign faults and the set 408 of data that notates sites that contain critical faults. The particular neural twin can have faults perturbed at one or more known fault sites, and sites from the set 406 of data that notates sites that contain benign faults can have faults perturbed (410) to establish (412) a maximum loss associated with benign faults or an upper limit for fault tolerance that is considered benign. Likewise, sites from the set 408 of data that notates sites that contain critical faults can have biases perturbed (414) to establish (416) a minimum loss associated with critical faults, or a lower limit of fault tolerance that is considered critical. For a given fault site, both a stuck-at-zero fault and a stuck-at-one fault is injected. Inferencing by the neural twin is used to obtain stuck-at-zero loss values across a workload and stuck-at-one loss values across the workload. For a stuck-at-zero fault, a −1 can be input to the bias value adder at a particular site. Similarly, for a stuck-at-one fault, a 1 can be input to the bias value adder at a particular site.

Biases can be perturbed in the particular neural twin using the bias value adders as described in FIG. 1C. An output of the neural twin (e.g., the loss value) as a result of the perturbed bias can be recorded. In some cases, instead of the output of the neural twin, a loss difference can be recorded instead, where a loss difference is a difference between the output (e.g., the loss value) of the neural twin with the perturbed bias and the output (e.g., the fault-free loss value) of the neural twin with no biases perturbed. The maximum loss between all perturbed faults can be stored as the final loss and can be used to train the decision tree classifier. Ultimately, a decision tree 418 can be produced based on the results of output of the neural twin at sites from the set 406 of data that notates sites that contain benign faults and sites from the set 408 of data that notates sites that contain critical faults.

Mathematically, this process can be described as follows. The error values are calculated for stuck-at-zero (s-a-0) and stuck-at-one (s-a-1) faults injected at location/in the neural twin (i.e., $bias_l$).

The error $e_F$ for fault F ∈{s-a-0, s-a-1} is calculated using:

$$e_F = \frac{1}{m}\sum_{j=1}^{m} MSE\left(\phi_{nt}^{PE}\left(D_{j,f};\text{bias}\right), y_{r,c,j}^{ps}\right)$$

The larger of the s-a-0 and s-a-1 errors is recorded as the input feature of the decision tree-based criticality classifier. The corresponding label is the ground-truth criticality c of the location l, where c=+1(−1) indicates the fault location l is critical (benign). The training procedure of DT attempts to obtain decision thresholds that can appropriately classify the training data set. A fault is classified using a decision tree based on different decision thresholds and eventually mapped to a leaf node in the tree which indicates the fault criticality (benign or critical). Multiple decision thresholds are required by the decision tree model in order to learn the non-linear class boundary separating the benign and critical faults. In the simulated example, the decision tree model was implemented as a classification and regression tree (CART).

The pseudocode is given as follows, where DT refers to decision tree.

```
Input: Neutral-twin model φ_nt^PE, biases bias, data set 𝒟,

critically ground truth (l, c) ∈ 𝒯

Output: trained DT tree
trec = DecisionTree( ); /*Initialize model*/
X ← Ø; /*Feature matrix*/
Y ← Ø; /*Label matrix*/
bias ← 0;
for (l, c) ∈ T do
|       for fault type F ∈ (s-a-0, s-a-1) do
|       |       bias[l] = −1 if F is s-a-0 else 1;
|       |       bias ← 0;
|       end
|       X.push(max(c_s-a-0, c_s-a-1)); /*Record the drror value*/
|       Y.push(c); /*c ∈ {−1, +1}*/
tree.train(X, Y);
return tree
```

FIGS. 5A-5C show an example implementation of neural-network-readable cell equivalent representations for use in neural twins. FIG. 5A shows a two-input AND gate (AND2 gate 500) with corresponding neural-network-readable cell equivalent 505 trained on a two-input AND gate truth table (as shown); FIG. 5B shows an inverter (INV gate 510) with corresponding neural-network-readable cell equivalent 515 trained on an inverter truth table (as shown); and FIG. 5C illustrates operation of a neuron inside a neural-network-readable cell equivalent of the example implementation.

In the example implementation of FIGS. 5A and 5B, it can be seen that a neural network formed of three fully connected layers with four neurons in first layer, four neurons in second layer, and one neuron in the third layer that outputs the binary state of the gate being modeled can be used as a neural-network-readable cell equivalent. Here, neural-network-readable cell equivalent is mathematically represented by a non-linear function, $\phi_{cell}$:

$$\phi_{cell}(z_{in})=\sigma_{sig}(A_3\sigma_{sig}(A_2\sigma_{sig}(A_1 z_{in}+b_1)+b_2)+b_3)$$

where $z_{in}$ denotes the binary input vector of size $r_z$; $A_1$, $A_2$, and $A_3$ are affine transformations of size $4\times r_z$, $4\times4$, and $1\times4$ respectively; $b_1$, $b_2$, and $b_3$ are bias vectors of the multi-layer perceptron network. The Sigmoid activation function present at the output of each neuron in this example implementation of a neural-network-readable cell equivalent is denoted by $\sigma_{sig}(\cdot)$. The sigmoid activation function ($\sigma_{sig}$) constrains the output to be a value from 0 to 1.

The input vector $z_{in}$ is composed of the binary inputs to the standard cell. When $z_1$ and $z_2$ are binary inputs to a standard cell, $z_{in}=[z_1, z_2]$. The size of the input vector, $r_z$, is equal to the number of input ports of the standard cell being modeled. For example, when the cell being modeled is an AND2 gate 500, as shown in FIG. 5A, $r_z$ is 2; and when the cell being modeled is an INV gate 510, as shown in FIG. 5B, $r_z$ is 1.

Turning to FIG. 5C, a single neuron of a cell-net can include parameters of vector a and scalar b, which denote weight vector and bias, respectively, which are used to relate the output to the input.

A neural-network-readable cell equivalent can be trained by any suitable method using a set of Boolean inputs as features and a single Boolean output as a label. The training can also include noisy data—random noise can be added. For example, as shown in FIG. 5A, a two-input AND gate has 4 rows in its corresponding truth table. A large number—for example 2500—of "noisy variants" can be created for each row by adding a "noise value"—a random value between 0 and some predetermined upper limit less than 1—to each of the binary inputs only that all map to the same binary output. When a neural-network-readable cell equivalent is appropriately trained, the neural-network-readable cell equivalent can be added to a library of neural-network-readable cell equivalents.

FIG. 6 shows a potential mathematical representation of the neural twin of FIG. 1C. A mathematical representation of a neural twin can be formed and saved for use elsewhere such as by software programs for neural networks. The mathematical representation can be a function comprising one or more circuit inputs, one or more variables, and one or more circuit outputs. The variables can represent values at various points in the circuit, for example electrical nodes between gates. The variables can be equations that relate bias inputs with circuit inputs, neural-network-readable cell equivalent function outputs, or both circuit inputs and neural-network-readable cell equivalent function outputs. The neural-network-readable cell equivalent function outputs can be a function of either one or more variables, one or more circuit inputs, or a combination thereof.

FIG. 7 shows a system for performing fault criticality analysis using a neural twin. For example, a computing device embodied as system 700 can be used to execute a fault criticality assessment, including the processes described with respect to FIGS. 1A-1C, 2, 3, 4, and 5A-5C. It should be understood that aspects of the system described herein are applicable to both mobile and traditional desktop computers, as well as server computers and other computer systems.

For example, system 700 includes a processor 705 (e.g., CPU, GPU, FPGA) that processes data according to instructions of various software programs, including software instructions 710 for performing fault criticality assessment using neural twins as described herein, stored in memory 715.

Memory 715 can be one or more of any suitable computer-readable storage medium including, but not limited to, volatile memory such as random-access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the memory 715 consist of transitory propagating signals.

As mentioned above, memory 715 can store instructions 710 for performing fault criticality assessment using neural twins as described herein. Instructions 710 may include instructions for method 200 described with respect to FIG. 2, method 300 for refinement of the neural twin, process 400 for training of a decision tree described with respect to FIG. 4, and creating and training neural-network-readable cell equivalent representations as described with respect to FIGS. 5A-5C. In some cases, instructions 710 further include instructions for ATPG, design for test application (e.g., BIST scan chain and other design for test element insertion/electronic design automation tool), and/or test point insertion. Memory 715 can also store data structures, for example, for the library 720 of neural-network-readable cell equivalents.

System 700 may also include a radio/network interface 725 that performs the function of transmitting and receiving radio frequency communications. The radio/network interface 725 facilitates wireless connectivity between system 700 and the "outside world," via a communications carrier or service provider. The radio/network interface 725 allows system 700 to communicate with other computing devices, including server computing devices and other client devices, over a network.

In various implementations, data/information used by and/or stored via the system 700 may include data caches stored locally on the device or the data may be stored on any number of storage media that may be accessed by the device via the radio/network interface 725 or via a wired connection between the device and a separate computing device associated with the device, for example, a server computer in a distributed computing network, such as the Internet. As should be appreciated such data/information may be accessed through the device via the radio/network interface 725 or a distributed computing network. Similarly, such data/information may be readily transferred between computing devices for storage and use according to well-known data/information transfer and storage means, including electronic mail and collaborative data/information sharing systems.

System 700 can also include user interface system 730, which may include input and output devices and/or interfaces such as for audio, video, touch, mouse, and keyboard. Visual output can be provided via a display that may present graphical user interface ("GUI") elements, text, images, video, notifications, virtual buttons, virtual keyboards, circuit layout, and any other information that is capable of being presented in a visual form.

System 700 can further include a neural network module 735. The neural network module 735 can include a dedicated processor and memory or use the processor 705 and memory 715. The memory of the neural network module can include code for execution of training methods as well as weights and models used by the neural network. The code for execution of training methods as well as weights and models used by the neural network can also be stored in the memory 715 for the rest of the system 700.

Accordingly, embodiments of the subject invention may be implemented as a computer process, a computing system, or as an article of manufacture, such as a computer program product or computer-readable storage medium. Certain embodiments of the invention contemplate the use of a machine in the form of a computer system within which a set of instructions, when executed, can cause the system to perform any one or more of the methodologies discussed above, including providing a software tool or a set of software tools that can be used during the physical design and test pattern generation of integrated circuits and/or printed circuit boards and/or system level design. The set of instructions for the software tool can be stored on a computer program product, which may be one or more computer readable storage media readable by a computer system and encoding a computer program including the set of instructions and other data associated with the software tool.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random-access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of transitory propagating signals.

FIG. 8 shows experimental results for fault criticality analysis using a neural twin. A percentage classification accuracy is denoted by $A_c$ and a percentage of critical fault locations misclassified as benign (i.e., test escapes) is denoted by $M_c$. Note that f % of labeled ground truths were randomly drawn as training data for the decision tree and experiments were repeated 10 times. Mean accuracy and standard deviation results were obtained (listed in the table in parentheses). The neural twin-based framework achieves $A_c$=100% and $M_c$=0% misclassification of critical faults by using the decision tree trained on only 8% of the labeled data for a 32-bit processing element (PE) (T32) and 5% of the labeled data for a 16-bit PE (T16). 8% of T32 corresponds to only 2% of all fault sites in the 32-bit PE. 5% of T16 corresponds to only 1.5% of all fault sites in the 16-bit PE.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of fault criticality assessment using neural twins, the method comprising:
- converting a netlist of a circuit design into a neural twin by:
  - replacing each circuit element of the netlist with a neural-network-readable cell equivalent, the neural-network-readable cell equivalent being a model of combinational logic of the circuit element; and
  - replacing each wire described in the netlist between two circuit elements with a neural connection;
- inserting bias value adders at locations in the neural twin;
- selecting sites at the neural twin for perturbation of bias, the selected sites corresponding to potential fault sites in the circuit design;
- while operating the neural twin, applying the perturbation of bias to each selected site;
- calculating a loss value for the neural twin corresponding to the applying of the perturbation of bias for each selected site; and
- classifying, using a neural-twin-trained classifier, a particular site of the selected sites as critical or benign based on the loss value from perturbing the bias at that site.

2. The method of claim 1, wherein selecting sites at the neural twin for perturbation of bias comprises:
- computing a bias sensitivity of potential fault sites; and
- selecting a number of fault sites as the selected sites according to the computed bias sensitivity.

3. The method of claim 2, wherein computing the bias sensitivity of potential fault sites comprises:
- receiving a fault-free loss value for a fault-free neural twin;
- receiving a corresponding bias of each of a plurality of potential fault sites; and
  - calculating a gradient of the fault-free loss value with respect to the corresponding bias at each of the plurality of potential fault sites, the gradient indicating the bias sensitivity; and
- wherein selecting the number of fault sites as the selected sites according to the computed bias sensitivity comprises:
  - ranking the potential fault sites of the plurality of potential fault sites by an absolute value of the gradient corresponding to each of the potential fault sites; and
  - selecting, as the selected sites, one or more of the potential fault sites based on a criteria with respect to the ranked potential fault sites.

4. The method of claim 3, wherein the criteria with respect to the ranked potential fault sites comprises a certain number of potential fault sites, a certain percentage of potential fault sites, or all potential fault sites with a bias sensitivity above a certain value.

5. The method of claim 1, wherein applying the perturbation of bias to each selected site comprises for each selected site:
- determining a sign of a bias sensitivity computed for that selected site;
- if the sign is determined to be positive, applying a first bias corresponding to a stuck-at-one fault; and
- if the sign is determined to be negative, applying a second bias corresponding to a stuck-at-zero fault.

6. The method of claim 1, wherein replacing each circuit element of the netlist with the neural-network-readable cell equivalent comprises obtaining the neural-network-readable cell equivalent from a library of neural-network-readable cell equivalents trained on truth tables associated with a corresponding circuit element.

7. The method of claim 1, wherein the neural-twin-trained classifier is a decision tree.

8. The method of claim 1, wherein the netlist is of an AI accelerator designed for image processing.

9. The method of claim 1, further comprising:
- generating the neural-network-readable cell equivalents by, for each neural-network-readable cell equivalent, training a neural network using a truth table for a corresponding circuit element.

10. A computer-readable medium having instructions stored thereon that when executed by a computing device, direct the computing device to:

convert a netlist of a circuit design into a neural twin by:
replacing each circuit element of the netlist with a neural-network-readable cell equivalent, the neural-network-readable cell equivalent being a model of combinational logic of the circuit element; and
replacing each wire with a neural connection described in the netlist between two circuit elements;
insert bias value adders at locations in the neural twin;
select sites at the neural twin for perturbation of bias, the selected sites corresponding to potential fault sites in the circuit design;
while operating the neural twin, apply the perturbation of bias to each selected site;
calculate a loss value for the neural twin corresponding to the application of the perturbation of bias for each selected site; and
classify, using a neural-twin-trained classifier, a particular site of the selected sites as critical or benign based on the loss value from perturbing the bias at that site.

11. The computer-readable medium of claim 10, further comprising instructions that direct the computing device to:
perform automatic test pattern generation, design for test application, or test point insertion based on selected sites classified as critical.

12. The computer-readable medium of claim 10, wherein the instructions to select the sites at the neural twin for perturbation of bias direct the computing device to:
compute a bias sensitivity of potential fault sites; and
select a number of fault sites as the selected sites according to the computed bias sensitivity.

13. The computer-readable medium of claim 12, wherein the instructions to compute the bias sensitivity of potential fault sites direct the computing device to:
receive a fault-free loss value for a fault-free neural twin;
receive a corresponding bias of each of a plurality of potential fault sites; and
calculate a gradient of the fault-free loss value with respect to the corresponding bias at each of the plurality of potential fault sites, the gradient indicating the bias sensitivity; and
wherein the instructions to select the number of fault sites as the selected sites according to the computed bias sensitivity direct the computing device to:
rank the potential fault sites of the plurality of potential fault sites by an absolute value of the gradient corresponding to each of the potential fault sites; and
select, as the selected sites, one or more of the potential fault sites based on a criteria with respect to the ranked potential fault sites.

14. The computer-readable medium of claim 13, wherein the criteria with respect to the ranked potential fault sites comprises a certain number of potential fault sites, a certain percentage of potential fault sites, or all potential fault sites with a bias sensitivity above a certain value.

15. The computer-readable medium of claim 10, wherein the instructions to apply the perturbation of bias to each selected site direct the computing device to, for each selected site:
determine a sign of a bias sensitivity computed for that selected site;
if the sign is determined to be positive, apply a first bias corresponding to a stuck-at-one fault; and
if the sign is determined to be negative, apply a second bias corresponding to a stuck-at-zero fault.

16. The computer-readable medium of claim 10, wherein the neural-twin-trained classifier is a decision tree.

17. The computer-readable medium of claim 10, wherein the netlist is of an AI accelerator designed for image processing.

18. The computer-readable medium of claim 10, wherein the instructions to insert the bias value adders at the locations within the neural twin comprises direct the computing device to insert the bias value adder at an output of each of the neural-network-readable cell equivalents.

19. The computer-readable medium of claim 10, further comprising instructions to:
generate the neural-network-readable cell equivalents by, for each neural-network-readable cell equivalent, training a neural network using a truth table for a corresponding circuit element.

20. The method of claim 1, wherein replacing each circuit element of the netlist with the neural-network-readable cell equivalent and replacing each wire with the neural connection comprises:
converting the netlist to a graph where the each circuit element is a represented as one or more vertices and the each wire is mapped as an edge between two vertices; and
assigning appropriate neural-network-readable cell equivalents to each vertex of the graph.

* * * * *